United States Patent
Oliveira et al.

(10) Patent No.: US 8,938,346 B2
(45) Date of Patent: Jan. 20, 2015

(54) METHOD FOR PROTECTING A VEHICLE WITH AN AUTOMATIC PARKING BRAKE

(75) Inventors: Raphael Oliveira, Backnang (DE); Michael Bachmann, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/818,732

(22) PCT Filed: Aug. 30, 2011

(86) PCT No.: PCT/EP2011/064883
§ 371 (c)(1), (2), (4) Date: May 8, 2013

(87) PCT Pub. No.: WO2012/031938
PCT Pub. Date: Mar. 15, 2012

(65) Prior Publication Data
US 2013/0226425 A1   Aug. 29, 2013

(30) Foreign Application Priority Data

Sep. 8, 2010   (DE) .......................... 10 2010 040 382
Nov. 26, 2010  (DE) .......................... 10 2010 062 013

(51) Int. Cl.
*B60T 7/12*   (2006.01)

(52) U.S. Cl.
CPC . *B60T 7/12* (2013.01); *B60T 7/122* (2013.01); *B60T 2201/06* (2013.01)
USPC .............................................. 701/70; 701/71

(58) Field of Classification Search
CPC ........ B60T 7/122; B60T 7/12; B60T 2201/06
USPC ....................................................... 701/70, 71
See application file for complete search history.

(56) References Cited

U.S. PATENT DOCUMENTS

| | | | |
|---|---|---|---|
| 2004/0011610 A1* | 1/2004 | Witzler et al. | 188/265 |
| 2010/0090522 A1* | 4/2010 | Bensch et al. | 303/122.15 |
| 2010/0211281 A1* | 8/2010 | Baier-Welt et al. | 701/70 |

FOREIGN PATENT DOCUMENTS

| | | |
|---|---|---|
| CN | 1874918 | 12/2006 |
| DE | 10 2007 001708 | 7/2008 |
| DE | 10 2007 030780 | 1/2009 |
| JP | 2006273090 | 10/2006 |
| JP | 2008-126962 | 6/2008 |
| WO | WO 02/12040 | 2/2002 |

OTHER PUBLICATIONS

International Search Report, dated Nov. 15, 2011, issued in corresponding PCT/EP2011/064883.

* cited by examiner

*Primary Examiner* — Mary Cheung
*Assistant Examiner* — Brian P Sweeney
(74) *Attorney, Agent, or Firm* — Kenyon & Kenyon LLP

(57) ABSTRACT

A method for holding a vehicle at a standstill includes a first phase in which the brake pressure at the wheel brakes is retained so that the vehicle is held automatically by the service brake, and the braking force is then transferred to a parking brake so that in a second phase the vehicle is held solely by the parking brake. A risk inherent in this transfer is that the vehicle may begin to slip. The distance over which the vehicle slides in uncontrolled fashion can be made substantially shorter if, in the second phase in which the vehicle is being held by the parking brake, the movement of the vehicle is monitored by sensors, and brake pressure is automatically built up by way of an actuator as soon as the fact that the vehicle is rolling away has been detected.

6 Claims, 2 Drawing Sheets

METHOD FOR PROTECTING A VEHICLE WITH AN AUTOMATIC PARKING BRAKE

CROSS REFERENCE TO RELATED APPLICATION

The present application is the national stage entry of International Patent Application No. PCT/EP2011/064883, filed on Aug. 30, 2011, which claims priority to Application No. DE 10 2010 062 013.0, filed in the Federal Republic of Germany on Nov. 26, 2010, and Application No. DE 10 2010 040 382.2, filed in the Federal Republic of Germany on Sep. 8, 2010.

FIELD OF INVENTION

The present invention relates to a method for holding a vehicle at a standstill.

BACKGROUND INFORMATION

Modern vehicles are often equipped with electrically actuated parking brakes, which are also referred to as automatic parking brakes (APBs). Parking brakes of this kind usually encompass an operating element, such as, e.g., a button, with which the parking brake can be locked or released. Upon an actuation of the button, a control unit connected thereto detects the parking brake request and correspondingly applies control to an actuator, for example to an electric motor, to engage or release the parking brake.

In addition, vehicles are often also equipped with braking functions that automatically hold the vehicle at a standstill with no need for the driver to actuate the brake pedal for that purpose. Known braking functions are, for example, automatic vehicle hold (AVH) or adaptive cruise control (ACC) plus stop-and-go. In the case of the AVH function, the brake pressure present at the wheel brakes is retained, and the vehicle is automatically held at a standstill; with the ACC plus stop-and-go function, in an appropriate traffic situation the vehicle is decelerated to a standstill, and automatically held, with no driver intervention.

To allow the brake pressure at the wheel brakes to be automatically held, a valve of the braking system, usually the so-called switchover valve, is closed. This requires that a specific valve current be applied to the valve. The switchover valves cannot, however, have current flowing through them for an arbitrarily long time, since otherwise they overheat. With conventional valves, the maximum capacity at a holding pressure of 45 bar is approximately ten minutes. The responsibility for holding the vehicle is therefore transferred, at the latest before the valves overheat, to a parking brake with which the vehicle can be held in zero-energy fashion. A switchover therefore occurs from the hydraulic brake to the parking brake.

In the switchover phase or transition phase, control is applied to the locking devices of the parking brake by a control unit so that they lock. Coincidentally in time or thereafter, the brake pressure present at the wheel brakes is reduced. As soon as the hydraulic brake pressure at the wheels is reduced, the vehicle as a rule is then braked only by those wheels on which the parking brake is located. These are usually the rear wheels. On steeper slopes and/or on a slippery surface, it is possible as a result for the vehicle abruptly to start slipping, and then to move downslope with the rear axle blocked. In this case the driver would need to recognize the critical situation and push the brake pedal in order to brake the vehicle. Since the transition to the parking brake does not occur until a few minutes after coming to a stop, however, the driver as a rule is no longer attentive and can react only in delayed fashion to the fact that the vehicle is slipping away. By the time the driver has recognized the situation and actuated the brake pedal, the vehicle may already have moved a relatively long distance downhill. The switchover to the parking brake, and the abrupt slippage of the vehicle associated therewith, can therefore result in a danger to the driver and occupants, or to other traffic participants.

SUMMARY

It is therefore an object of the present invention to improve driving safety in those situations in which a transfer of braking forces from the hydraulic brake to the parking brake takes place, and the vehicle abruptly begins to move.

According to the present invention it is proposed that in the phase in which the vehicle is held solely by the parking brake, vehicle motion is monitored by way of a suitable sensor apparatus, and that brake pressure is automatically built up by way of the service brake system as soon as a movement of the vehicle has been detected. The monitoring of vehicle movement allows immediate detection of the fact that the vehicle is slipping away, and a correspondingly rapid reaction thereto. The distance that the vehicle can move downhill in uncontrolled fashion can therefore be substantially shortened as compared with an inattentive driver.

According to a preferred exemplary embodiment of the present invention, at least one wheel rotation speed of a free-running wheel is measured and evaluated for movement monitoring. Alternatively, the vehicle movement can also be monitored by way of a different sensor apparatus, such as, e.g., a known optical sensor apparatus, one or more radar sensors, by evaluating position data, by way of a video system, or any other known sensor apparatus. As a further alternative, an acceleration sensor that, for example, measures the longitudinal acceleration of the vehicle can also be used. When the vehicle begins to roll, a brief initial roll jerk usually occurs, which can be detected by way of the acceleration sensor. In addition, the transverse acceleration can also be monitored in order to detect lateral slippage of the vehicle. Modern vehicles usually encompass a so-called inertial sensor apparatus, having at least two acceleration sensors and a yaw rate sensor, which can be used in this case.

The service brake system can be, for example, a hydraulic or pneumatic brake system.

According to a preferred exemplary embodiment of the present invention, as soon as it has been recognized that the vehicle is slipping away, a warning signal is furthermore outputted which informs the driver of the critical situation. The warning signal can be, for example, an acoustic and/or optical signal. Preferably at least one warning sound is emitted.

In order to increase the brake pressure at the wheel brakes, control is preferably applied correspondingly to a hydraulic pump or another actuator of the braking system.

The transfer from the service brake to the parking brake can occur, for example, in time-controlled fashion. It can also, however, be dependent on brake temperature or on the presence of the driver in the vehicle. For example, a switchover to the parking brake preferably occurs if the driver switches off the ignition and/or leaves the vehicle.

Exemplary embodiments of the present invention will be explained in further detail below, with reference to the accompanying drawings.

DETAILED DESCRIPTION

When a vehicle is being automatically held at a standstill, i.e., without actuation of the brake pedal by the driver for that purpose, a variety of components of the service braking system can overheat as a result of the continuous current flow. Valves such as, for example, the switchover valve, or also the flow-regulating output stages in the control unit, are particularly affected thereby. The braking forces are therefore transferred after a certain time to the parking brake, with which the vehicle can be held in zero-energy and therefore zero-loss fashion.

Figure 1:
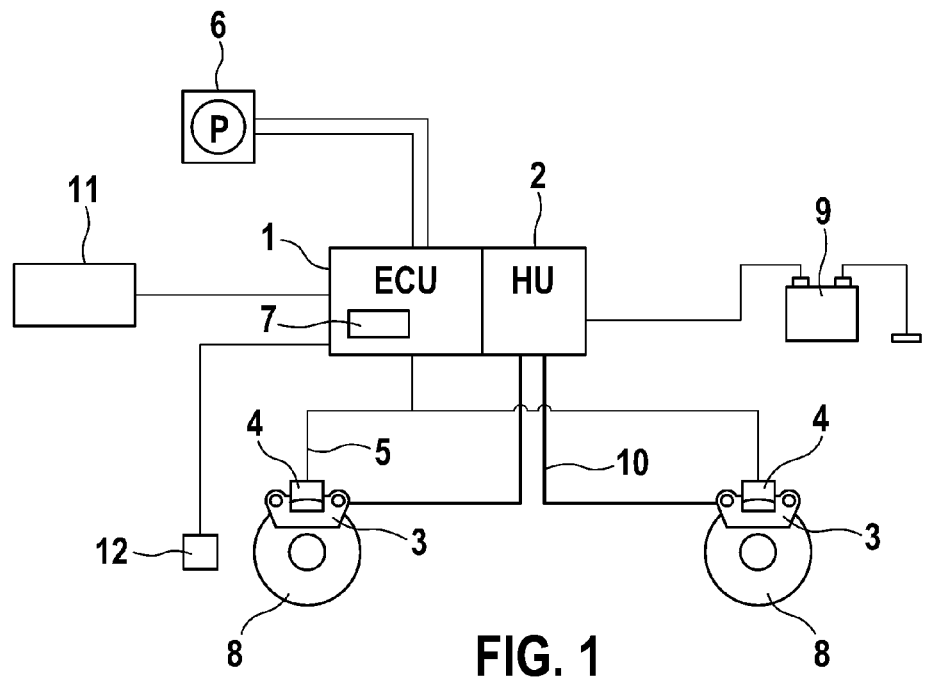
FIG. 1 is a schematic block depiction of a parking brake.

FIG. 1 shows an exemplifying embodiment of an electrically actuated parking brake as known substantially from the existing art. The parking brake encompasses an operating element 6 (button) for activating/deactivating the parking brake, a control unit 1, a hydraulic unit 2 having a hydraulic pump, and two wheel brakes 3, 8 having pertinent locking devices 4. Locking devices 4 of the parking brake are provided only on the wheels of the rear axle. The wheel brakes of the front wheels cannot be locked.

After an actuation of button 6, control unit 1 applies control to the pump and valves of hydraulic unit 2 so that pressure builds up in hydraulic lines 10, and the brake linings are pressed against brake discs 8. When the locking brake pressure is reached, control unit 1 applies control to the electric motors of locking devices 4 and thereby locks wheel brakes 3, 8. The brake pressure is then reduced again. The brake pistons are prevented by locking device 4 from moving back into the initial position, so that the parking brake remains engaged.

After the transfer of energy to the parking brake and the reduction in hydraulic brake pressure at the wheels of the front axle, it can happen that the vehicle unexpectedly begins to move, since it is now braked only by two wheels. In order to recognize this situation as quickly as possible, vehicle movement is monitored by way of a suitable sensor apparatus 12, e.g., by way of at least one wheel rotation speed sensor. If the at least one rotation speed signal supplies a value not equal to zero, control is automatically applied by control unit 1 to hydraulic pump 2, and brake pressure is thereby built up. As a result, the vehicle can very quickly be stopped again.

Figure 2:
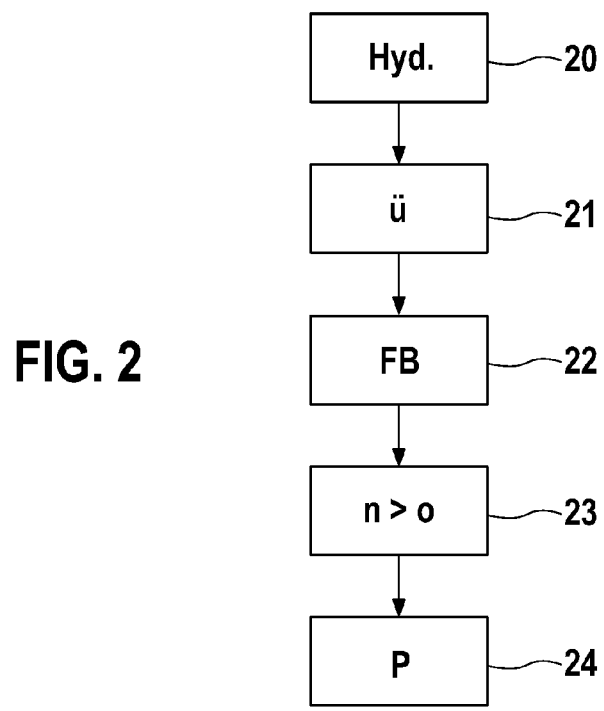
FIG. 2 is a schematic block diagram of a method for safeguarding a vehicle that is held at a standstill by a parking brake.

FIG. 2 shows the essential states of the method described above. Box 20 therein refers to a state in which the vehicle is being held solely by the hydraulic service brake, the brake pressure at the wheel brakes being retained. In block 21, a transfer takes place from the hydraulic service brake to parking brake 1, 4, 6: firstly locking devices 4 of parking brake 1, 4, 6 are locked, and then the hydraulic brake pressure at wheel brakes 3, 8 is reduced. In state 22, the vehicle is ultimately held only by the parking brake at the rear wheels. In block 23, the fact that the vehicle is rolling away is detected, and in block 24 the brake pressure is automatically built up in order to bring the vehicle once again to a standstill.

Figure 3B:
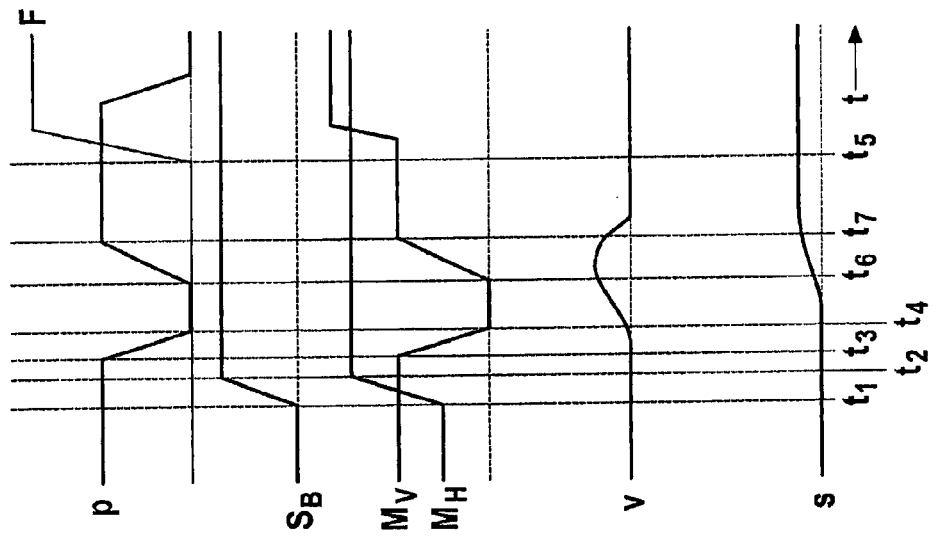
FIGS. 3a and 3b show the profiles of various state variables in a vehicle having automatic standstill safeguarding.
Figure 3A:
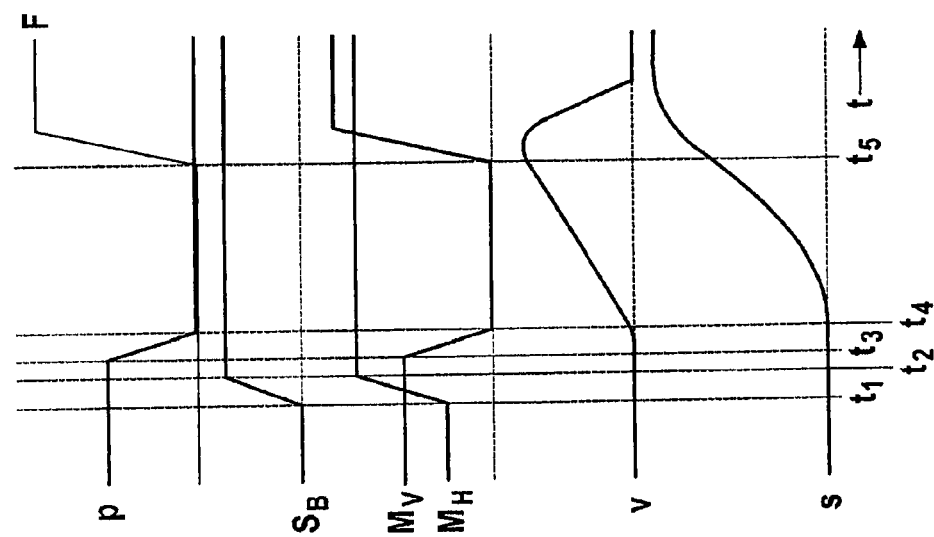

FIGS. 3a and 3b show the profiles of a variety of state variables in a vehicle having automatic standstill safeguarding (FIG. 3b) and without automatic standstill safeguarding (FIG. 3a).

At the beginning of the plot, the brake pressure p is greater than zero bar, the parking brake is in the unlocked position ($s_B = 0$), the braking torques at the front axle $M_V$ and rear axle $M_H$ are greater than zero. The vehicle speed v is equal to zero, i.e., the vehicle is at a standstill, and the distance s traveled by the vehicle is likewise equal to zero.

At time $t_1$ the parking brake begins to be applied, and the brake torque $M_H$ at the rear axle correspondingly increases. At time $t_2$ the parking brake has reached the locked position. At time $t_3$ the hydraulic brake pressure p is reduced so that the vehicle is now held only by the parking brake. At time $t_4$ the vehicle begins to slip. In the case of the system (depicted in FIG. 3a) without additional standstill safeguarding, it takes until time $t_5$ for the driver to notice this and to actuate the foot-operated brake pedal (signal F). The result is that the vehicle may already have traveled a relatively long distance s.

In the case of the system according to the present invention (depicted in FIG. 3b) having standstill safeguarding, conversely, slippage of the vehicle is already detected at time $t_6$, and brake pressure is automatically built up immediately thereafter. The braking torque $M_V$ at the front axle correspondingly decreases. The result is that the vehicle can be stopped again at time $t_7$ after only a very short distance s, thereby considerably improving driving safety for the driver and occupants.

What is claimed is:

1. A method for holding a vehicle at a standstill, comprising:
   automatically holding the vehicle by a service brake in a first phase; and
   subsequently automatically triggering transfer to a parking brake such that after the transfer, the vehicle is held solely by the parking brake in a second phase;
   wherein in the second phase, movement of the vehicle is monitored in sensor-based fashion and the service brake is automatically activated as soon as unintentional movement of the vehicle is detected.

2. The method according to claim 1, wherein at least one wheel rotation speed is monitored by a wheel rotation speed sensor in order to detect the unintentional movement of the vehicle.

3. The method according to claim 1, further comprising:
   outputting a warning signal when the unintentional movement of the vehicle including rolling or slipping away from the standstill with the parking brake applied has been detected, wherein the warning signal is outputted at least one of acoustically and optically.

4. The method according to claim 1, wherein brake pressure of the service brake is automatically elevated via a pump when the unintentional movement of the vehicle has been detected.

5. The method according to claim 1, wherein the transfer from the service brake to the parking brake occurs as a function of one of time, brake temperature, and a presence of a driver in the vehicle.

6. A control unit configured to carry out a method for holding a vehicle at a standstill, the method comprising:
   automatically holding the vehicle by a service brake in a first phase; and
   subsequently automatically triggering transfer to a parking brake such that after the transfer, the vehicle is held solely by the parking brake in a second phase;
   wherein in the second phase, movement of the vehicle is monitored in sensor-based fashion and the service brake is automatically activated as soon as unintentional movement of the vehicle is detected.

* * * * *